Nov. 9, 1937.  L. E. REED  2,098,880
SLED
Filed Aug. 18, 1936  2 Sheets-Sheet 1
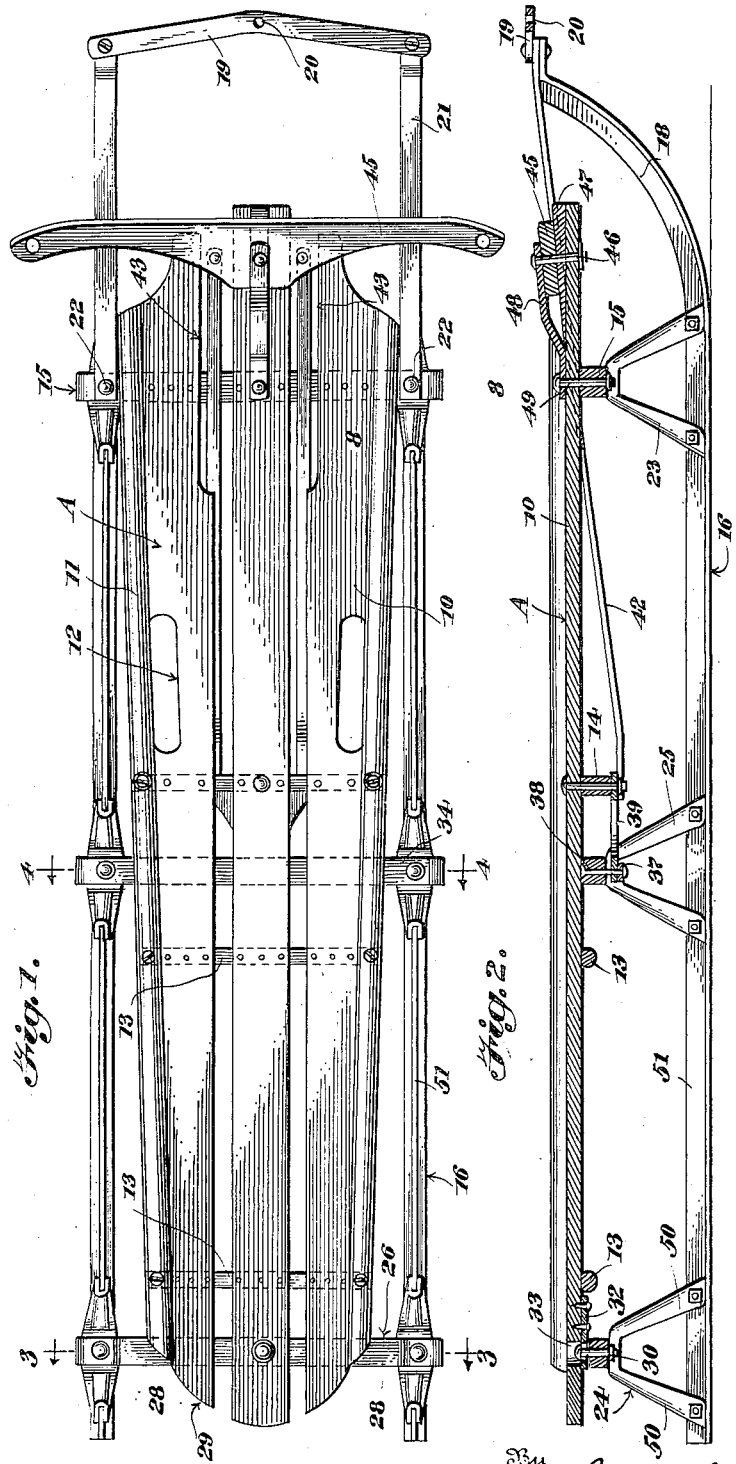
Inventor
LAWRENCE E. REED
By Irving L. McCathran
Attorney Nov. 9, 1937.  L. E. REED  2,098,880
SLED
Filed Aug. 18, 1936  2 Sheets-Sheet 2
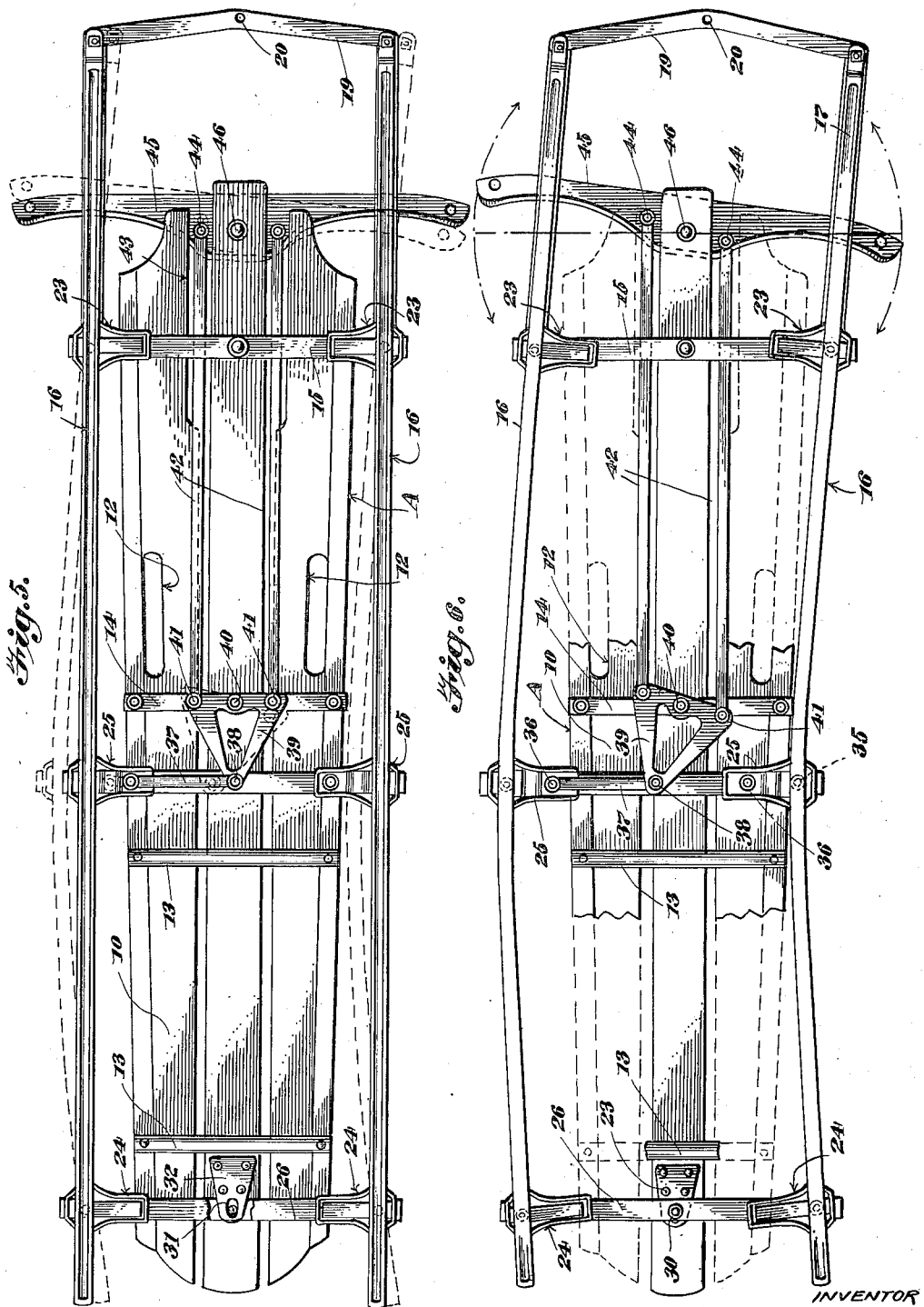
INVENTOR
LAWRENCE E. REED Patented Nov. 9, 1937

2,098,880

UNITED STATES PATENT OFFICE 2,098,880

SLED

Lawrence E. Reed, York, Nebr.

Application August 18, 1936, Serial No. 96,669

6 Claims. (Cl. 280—22)

This invention relates to sleds, and has for one of its objects the production of a simple and efficient steering mechanism therefor, which is so constructed as to permit of a maximum degree of accuracy and certainty when steering the sled.

Another object of this invention is the production of a simple and efficient means for mounting the runners of the sled in a manner whereby the runners may be flexed at their center for curving the runners throughout their entire length.

A further object of this invention is the production of a sled wherein the runners are so mounted as to flex laterally of the body or floor boards of the sled without lateral movement or twist of the body or floor boards.

Other objects and advantages of this invention will appear throughout the following specification and claims.

In the drawings:—

Figure 1 is a top plan view of the sled;

Figure 2 is a central longitudinal section through the sled;

Figure 3 is a transverse sectional view taken on line 3—3 of Figure 1;

Figure 4 is a transverse sectional view taken on line 4—4 of Figure 1;

Figure 5 is a bottom plan view of the sled, certain parts being broken away;

Figure 6 is a bottom plan view of the sled, certain parts being broken away and the runners being shown flexed;

Figure 7 is a bottom plan view of one of the runner braces, also illustrating a portion of one of the runners as well as a portion of one of the transverse bars;

By referring to the drawings, it will be seen that A designates the body of the sled which consists of a plurality of longitudinally extending spaced floor boards 10. The outer floor boards 10, along each outer side edge thereof, is a bead or side rail 11, the floor boards 10 tapering toward the rear end of the body A to provide a stream-line design and also to provide a foot rest at the rear end of the sled as will be hereinafter described. The outer floor boards 10 are provided near the outer side edges with hand-hold apertures 12 adjacent the beads or rails 11, and near the forward end of the body as shown in Figure 1. These spaced floor boards 10 are secured together by means of the transversely extending cleats 13 located near the rear end of the body A. A transversely extending bar 14 is also secured to the under face of the floor boards 10 intermediate the ends of the body A and the forward ends of the floor boards 10 are anchored firmly upon the forward transversely extending bracing bar 15.

A pair of spaced parallel runners 16 are carried in conjunction with the body A and preferably embody inverted T-shaped flexible steel members which are slightly channeled as at 17 along their under faces as is common with such runners. The forward ends of the runners 16 are curved upwardly, as at 17, and are connected by a transversely extending tie bar 19 at their forward extremities, the tie bar 19 being provided with an aperture 20 to facilitate the attachment of a pull rope or other similar means. The forward ends 18 of the runners 16 are also braced by means of the rearwardly extending strap members 21 which rearwardly extending members 21 are secured to the forward ends of the runners 18 and are pivotally connected, as at 22, to the opposite ends of the forward transversely extending bracing bar 15. This structure is clearly shown in Figure 1 of the drawings.

The runners 16 support near their forward ends a pair of aligned runner braces 23 and at their rear ends a pair of transversely aligned runner braces 24. A pair of transversely aligned runner braces 25 are also carried by the runners 16 intermediate the braces 23 and 24. The forward runner braces 23 are securely fastened to the runners 16 near their forward ends and also firmly engage the under face of the forward transverse bracing bar 15 and constitute a support therefor, the bolts 22 passing through the straps 21, the ends of the bar 15 and also the runner braces 23 which pivotally secure these runner braces to the ends of the transverse bar 15. The forward end of the body A will therefore be fixed to the forward bar 15, whereas the runners near their forward ends will be pivotally connected to this bar through the medium of the anchoring pins 22.

The rear runner braces 24 are pivotally connected to the ends of a rear transverse bar 26 through the medium of the pivot pins 27, as shown in Figure 3, and this rear transverse bar 26 is so mounted as to permit a slight transverse sliding movement with respect to the body A, as will be hereinafter described. This rear bar 26 is also provided upon its upper face with cutout sockets 28 to provide foot rests, and the rear end of the body is shaped to taper, as indicated at 29, in Figure 1. This will provide ample room for the feet of the person using the sled and permit him to catch his heels in the notches 28 thereby holding his feet from slipping. The rear end of the body A is anchored against displacement from the rear bar 26 through the medium of a journal pin 30 which extends vertically through the center of the bar 26 and fits through the enlarged elongated slot 31 formed in the rear end of the tie plate 32. This tie plate 32 is fixed to the bottom of the body A, as shown. The body A is apertured at its rear end as indicated at 33, to receive the head of the journal pin 30 and to permit of the proper shifting of the body A transversely as the runners are bowed. Through the medium of this structure, the rear end of the body A will be firmly anchored against displacement from the rear bar 26 but at the same time proper allowance is made for the shortening of the runners as they are bowed laterally, preventing a binding action and permitting at the same time, the free flexing of the runners 16.

The intermediate runner braces 25 support a transversely extending center supporting bar 34 which constitutes a truss or supporting means for the body A intermediate its ends and at the same time is free to shift laterally with the flexing of the runners 16 since the upper face of this bar will freely slide transversely across the under face of the body A. These runner braces 25, however, are anchored against pivotal movement to the central bar 34 through the medium of the spaced anchoring bolts or pins 35 and 36. The bolt 36 of one of the runner braces 25 is connected to a shifting link 37, which link extends parallel with and under the bar 34 toward its center and in turn is connected to a journal pin 38 at its outer end which is anchored upon the bar 34, and this pin 38 also connected with the rear apex of the triangular-shaped operating plate 39. This triangular-shaped operating plate 39 is pivotally connected, as at 40, to the under face of the bar 14, the outer corners of the operating plate 39 being pivotally connected, as at 41, to the inner ends of the parallel operating links 42. These operating links 42 extend forwardly along the under face of the body A through the major portion of their length and the forward ends of these links 42 extend upwardly through the notched portions 43 of the body A where they are pivotally secured, as at 44, to the transversely extending steering bar 45. This steering bar 45 is pivotally connected to a journal pin 46 carried by the forward end of the body A, a wedge block 47 being interposed between the upper face of the body A and the lower face of the steering bar 45. A metal strap 48 overhangs the steering bar 45 and is connected to the upper end of the journal pin 46 and this strap is connected to the anchoring pin 49 at its rear end which pin 49 passes down through the body A and through the forward bar 15. The steering bar 45 may therefore be swung upon its journal pin 46 causing one link 42 to be pulled forwardly and the other link to be pushed rearwardly and this will pivotally swing the operating plate 39 pushing upon the link 37 and shifting the central bar 34 laterally for the purpose of bowing or warping the runners 16 in the desired direction thereby facilitating the steering of the sled.

By carefully considering Figures 3, 4 and 7, it will be noted that I have devised a specially constructed type of runner brace, all of the runner braces 23, 24 and 25 being similarly constructed and preferably pressed or stamped from blank sheets of material. In view of the fact that all of the braces are similarly constructed, the construction of the brace as shown in Figures 3 and 7, will be specifically described, this brace is designated by the numeral 24. It will be noted that this typical brace comprises a pair of diverging legs which are notched at their lower ends for straddling the upwardly extending web portion of the runners 16, and these leg portions 50 terminate at their upper ends in a laterally extending formed body having a depending flange 52 formed around the edge and a depressed portion 53 upon the top thereof for the purpose of reinforcing the body. In connection with the forward braces 23 and the rear braces 24, transversely extending reinforcing plates 54 are utilized for fitting under the laterally extending portions of the braces 24 to stiffen these laterally extending portions, and these plates 54 are anchored upon the pins 27. The intermediate braces 25 do not utilize these stiffening plates 24 since they are anchored at their inner ends through the medium of the pins 36. These plates 24 will assist in holding the inwardly extending or laterally extending portions of the braces 24 with the under faces of the bars 26 and 15.

From the foregoing description, it will be seen that a very simple and efficient means has been provided for supporting the body of the sled upon the runners in a manner whereby the runners may be freely flexed at their center and bowed throughout their entire length, the body being sturdily supported in conjunction with the runners and at the same time permitting the free flexing of the runners. The transverse bar 34 will constitute an efficient support for the center of the body A and at the same time may be freely shifted transversely of the body A as the steering bar 45 is swung.

It should be understood that when it is desired to flex the runners, the steering bar 45 may be swung in the direction of the turn desired, and this movement will cause the bar 34 to be shifted laterally in the desired direction, bowing the runners 16 intermediate their ends and this consequent shortening movement of the runners will be permitted by the slotted arrangement of the plate 32. The braces 24 and 23 are pivotally connected at their respective supporting bars 26 and 15.

Certain detail changes in the mechanical construction may be employed without departing from the spirit of the invention, so long as such changes fall within the scope of the appended claims.

Having described the invention, what I claim as new is:

1. In a sled of the class described, a body, flexible runners, front and rear cross bars pivotally connected to said runners, said front bar being fixed to said body, a tie plate secured to said body, said tie plate having a longitudinal slot, an anchoring bolt passing through said slot and rear bar for connecting said body to said rear bar and permitting longitudinal shift of the rear bar with respect to said body, and means for flexing said runners.

2. In a sled of the class described, flexible runners, front and rear bars pivotally connected to said runners, a body supported upon said bars, an intermediate bar fixed to said runners intermediate their ends and laterally slidable upon said body, an operating plate pivotally connected to said body, and also pivotally connected to said intermediate bar, operating link means connected to said plate, and a transverse steering bar pivoted to said body and connected to said link means for swinging said plate and shifting said intermediate bar for flexing said runners as said steering bar is swung.

3. In a sled of the class described, flexible runners, front and rear bars pivotally connected to said runners, a body supported upon said bars, an intermediate bar fixed to said runners intermediate their ends and laterally slidable upon said body, a triangular-shaped operating plate pivotally connected to said body, and also pivotally connected to said intermediate bar, parallel links pivotally connected to said plate upon opposite sides of its pivot, a transverse steering bar pivoted to said body, and said links being pivotally connected to said bar upon opposite sides of its pivot connection with said body.

4. In a sled of the class described, flexible runners, front and rear transverse bars pivotally connected to said runners, a body supported upon said bars, an intermediate bar fixed to said runners intermediate their ends and slidable transversely with respect to said body, an operating plate pivotally secured to said body and also pivotally connected to said intermediate bar, longitudinally extending links pivotally connected to said plate, a transverse steering bar pivotally connected to said body, said longitudinally extending links being pivotally connected to said steering bar, and a bracing link connected to said plate and near one end of said intermediate bar.

5. In a sled of the class described, flexible runners, front and rear bars pivotally connected to said runners, a body supported upon said bars, an intermediate bar slidable transversely with respect to said body and anchored at its ends to said runners intermediate the ends of said runners, an operating plate pivotally secured to the under face of said body and having a projecting end pivotally connected to said intermediate bar, longitudinally extending spaced links pivotally connected to said plate upon opposite sides of the pivot connection of said plate with said body, the bars extending along the under face of said body through a portion of their length, the body having cut-away portions, said links extending through said cut-away portions and projecting over the upper face of the body, a steering bar pivotally secured to the upper face of the body, and said links being pivotally connected to said steering bar upon opposite sides of its pivotal connection with said body whereby said runners may be flexed as said steering bar is swung.

6. In a sled of the class described, a body, flexible runners carried thereby, means extending across the front of said body and pivotally connected to said runners, said means being fixed to said body, a rear bar extending across the rear of said body and pivoted to the runners near their rear ends, means for slidably connecting said rear bar to said body to permit longitudinal shift of the rear bar with respect to said body, and means for flexing said runners.

LAWRENCE E. REED.